United States Patent
Thawani et al.

[11] Patent Number: 5,521,340
[45] Date of Patent: May 28, 1996

[54] TUNED TUBE MUFFLER FOR AN AUTOMOTIVE VEHICLE

[75] Inventors: Prakash T. Thawani; Chhotubhai N. Patel, both of Farmington Hills, Mich.

[73] Assignee: Ford Motor Company, Dearborn, Mich.

[21] Appl. No.: 223,275

[22] Filed: Apr. 5, 1994

[51] Int. Cl.⁶ ................................................. F16K 47/02
[52] U.S. Cl. ............................................ 181/233; 181/227
[58] Field of Search ................................. 181/227, 228, 181/229, 233, 249, 250, 255, 403; 417/312

[56] References Cited

U.S. PATENT DOCUMENTS

| | | |
|---|---|---|
| 2,297,046 | 9/1942 | Bourne ................................... 181/250 |
| 2,882,993 | 4/1959 | Murty . |
| 2,956,586 | 10/1960 | Zeigler et al. . |
| 3,323,305 | 6/1967 | Klees . |
| 3,379,277 | 4/1968 | Hilly . |
| 3,655,010 | 4/1972 | Dubois ................................... 181/227 |
| 3,766,992 | 10/1973 | Tiraspolsky et al. . |
| 3,874,417 | 4/1975 | Clay . |
| 4,111,278 | 9/1978 | Bergman ................................ 181/249 |
| 4,285,534 | 8/1981 | Katayama et al. . |
| 4,418,443 | 12/1983 | Fischer ................................ 181/250 X |
| 5,020,943 | 6/1991 | Filipelli . |
| 5,094,271 | 3/1992 | Fritz et al. . |
| 5,172,729 | 12/1992 | Vantellini . |
| 5,173,576 | 12/1992 | Feuling ................................ 181/249 X |
| 5,183,974 | 2/1993 | Wilhelm et al. ....................... 181/249 X |
| 5,435,699 | 7/1995 | Thawani et al. ......................... 417/312 |

FOREIGN PATENT DOCUMENTS 54-54437  4/1979  Japan .

*Primary Examiner*—Khanh Dang
*Attorney, Agent, or Firm*—Raymond L. Coppiellie; Roger L. May

[57] ABSTRACT

An apparatus for attenuating noise produced by fluid pressure pulsations in a hydraulic system in an automotive vehicle is disclosed. The apparatus includes a muffler device comprising a generally elongate tubular member having a predetermined number of attenuating zones therein, each zone having a cross-sectional area of different size than the cross-sectional area of the tubular member. The attenuating zones are spaced at unequal lengths from one another to achieve maximized noise reduction benefits.

5 Claims, 2 Drawing Sheets

TUNED TUBE MUFFLER FOR AN AUTOMOTIVE VEHICLE

BACKGROUND OF THE INVENTION

1. Field of The Invention

The present invention relates generally to an apparatus for attenuating pressure pulsations in a hydraulic system. More particularly, the present invention relates to a tube muffler for air conditioning system of an automotive vehicle which attenuates the pressure pulsations propagated from the compressor of the air conditioning system.

2. Disclosure Information

Automotive heating, ventilating and air conditioning systems are known to be an annoying source of noise in a vehicle's passenger compartment. There are two components in the HVAC system that generate the majority of the noise: the air conditioning compressor in the refrigeration system and the blower in the air distribution system. The air conditioning compressor can produce a variety of steady state intransient noises depending on the ambient conditions, the type of compressor: (piston, rotary or scroll), number of cylinders in the engine and the associated drive ratio, and different engine operating conditions. The majority of the objectionable noise produced by the compressor results from the acoustical wave propagation of the air conditioning refrigerant through the air conditioning hoses in the engine compartment. These pulsations are readily transmitted through the various components in the air conditioning system, such as the evaporator or accumulator to become audible in the vehicle interior.

The prior practice in compressor noise reduction has been to test a variety of packageable, standard expansion chamber-type mufflers and evaluate/optimize them by trial and error to determine an acceptable configuration. This type of design and tuning process becomes very irrational, expensive, and can result in mufflers tuned to the wrong frequencies. Therefore, it would be advantageous to provide an air conditioning muffler which could be used to tune an automotive air conditioning compressor operating at a variety of wave propagation frequencies with minimal amounts of trial and error to determine optimal configurations.

SUMMARY OF THE INVENTION

The present invention solves the problems associated with the prior art by providing an apparatus for attenuating noise produced by fluid pressure pulsations in a hydraulic system of an automotive vehicle. The apparatus comprises a generally elongate fluid conduit member which receives a flow of fluid from the hydraulic system therethrough, the fluid conduit member having a predetermined cross-sectional area normal to the fluid flow therethrough. The apparatus further comprises muffler means connected to the fluid conduit member for attenuating pressure pulsations and noise resultant therefrom produced by the hydraulic system. The muffler means comprises a generally elongate tubular member having a predetermined number of attenuating zones, each zone having a cross-sectional area of different size than the cross-sectional area of the fluid conduit member. In the preferred embodiment, the distances between the attenuating zones are unequal and are based upon the frequency of the pulsations to be attenuated. The present invention has particular utility for attenuating the noise produced by pressure pulsations of a compressor in an automotive air conditioning system.

There is further disclosed herein a method for tuning an air conditioning system to reduce noise produced by fluid pressure pulsations resulting from the compressor in this system. The method comprises the steps of measuring the frequency of fluid pressure pulsations emanating from the compressor at various operating speeds, determining an optimized muffler configuration for the offensive frequency bands and forming a tube muffler having a plurality of attenuating zones therein. This step includes the step of spacing the attenuating zones at unequal lengths from one another, the lengths being determined based upon the measured frequencies. The method further includes inserting the muffler into the suction/discharge fluid flow from the compressor.

These and other objections, features and advantages of the present invention will become apparent from the drawings, detailed description and claims which follow.

DETAILED DESCRIPTION OF THE PREFERRED EMBODIMENTS

Figure 1:
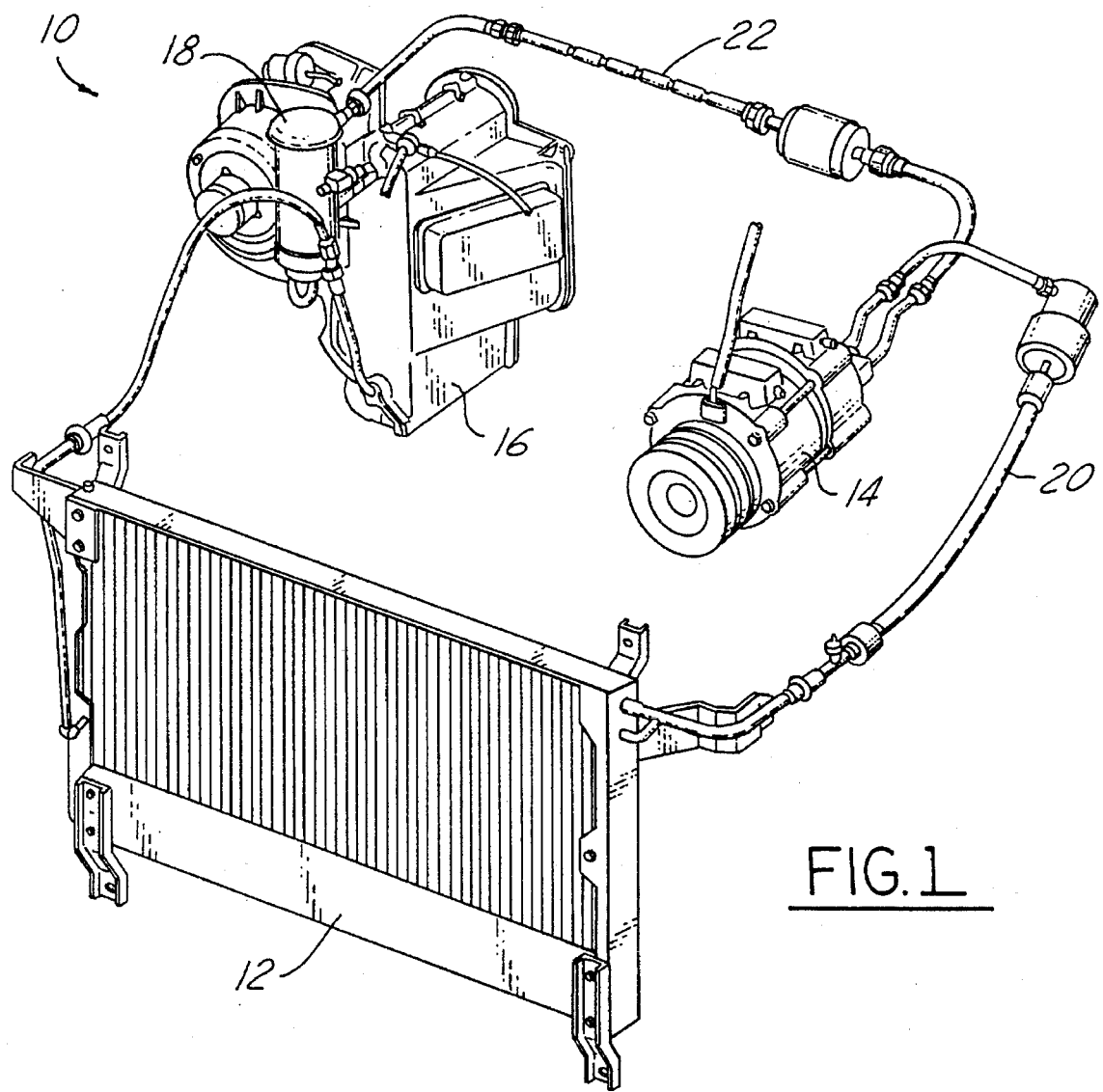
FIG. 1 is a perspective view of the major component of an automotive air conditioning system.

Referring now to the drawings, FIG. 1 shows a diagram of a typical automotive air conditioning system with its major components. The air conditioning system 10 includes a condenser assembly 12, a compressor 14, an evaporator assembly 16, and an accumulator 18. As is well known in the art, these components are fluidly connected by hoses 20. The details of the operation of an air conditioning system are well known to those skilled in the art and need not be explained here. As will be explained in detail below, the air conditioning system 10 includes a muffler assembly 22 for attenuating the wave pulse propagations and resultant noise from the compressor. The present invention will be explained with respect to the air conditioning system 10 of FIG. 1; however, it is not meant to be limited thereto. The present invention has application to any type of hydraulic system such as a power steering system, fuel lines and engine exhaust/intake systems.

Figure 2:
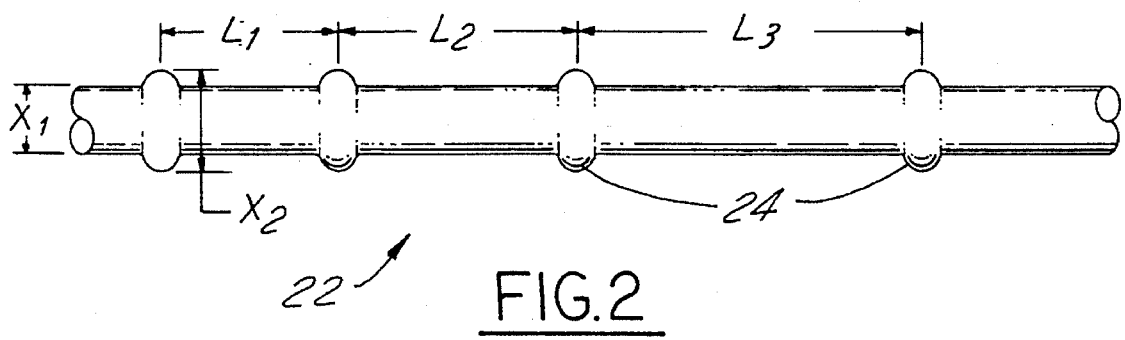
FIG. 2 is a cross-sectional view of a hose muffler structured in accord with the principles of the present invention.
Figure 3:
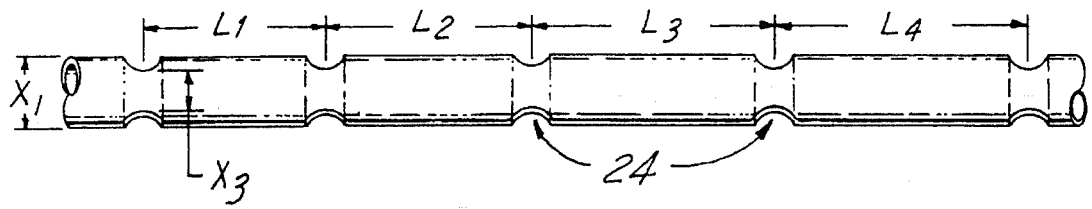
FIG. 3 is a cross-sectional view of an alternative hose muffler structured in accord with the principles of the present invention.

The muffler assembly 22 is shown in greater detail in FIGS. 2 and 3. The muffler assembly is a generally elongate, tubular member having a predetermined number of attenuating zones 24 therein. The tubular member of the muffler assembly has a generally constant cross-sectional area ($x_1$) normal to the direction of fluid flow therethrough. Each of the attenuating zones 24 has a cross-sectional area ($x_2$)

normal to the direction of fluid flow which is different in size from the cross-sectional area ($x_1$) of the tubular member. As shown in FIG. 2, the attenuating zones 24 are expansion chambers wherein the cross-sectional area $x_2$ is larger than the cross-sectional area $x_1$ of the tubular member. In FIG. 3, the attenuating zones 24 are restrictions in the tubular member and, therefore, have a cross-sectional area $x_3$ smaller than the cross-sectional area $x_1$ of the tubular member.

As can also be seen in FIGS. 2 and 3, the distances between each of the attenuating zones are unequal. For example, the distance $L_1$ is smaller than the distance $L_2$. Likewise, the distance $L_2$ is smaller than the distance $L_3$. By providing a hose muffler assembly wherein the distances between the attenuating zones 24 are unequal, a variety of different frequencies can be attenuated with a single member, without the need for trial and error determination of a single size expansion chamber as was done in the prior art. This also facilitates tuning the hoses right from the fundamental harmonics corresponding to the compressor pulsations.

Figure 4:
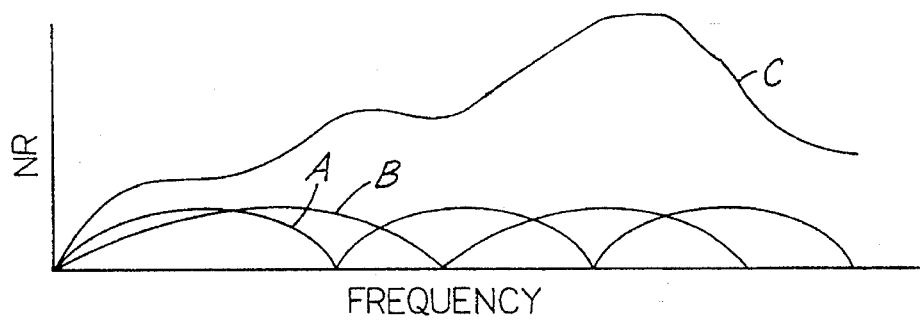
FIG. 4 is a plot of the noise reduction versus frequency of the hose muffler of the present invention.

FIG. 4 shows a plot of the noise reduction versus a frequency to be attenuated for a hose muffler according to the present invention. In the plot of FIG. 4, the lines A and B represent the noise reduction plots for a single length expansion chamber muffler typically used in the prior art. The acute acoustical performance of this type of expansion chamber-type muffler is maximized for a chamber length (L) equal to the quarter wave length corresponding to the frequency that needs to be attenuated. These types of expansion chamber type mufflers produce maxima and minima at odd and even multiples of quarter wave lengths respectively. This can be seen in FIG. 4 wherein the transmission loss (noise reduction) characteristics go to 0 at specific frequencies along the x-axis. What this means is that if a single length expansion-type chamber muffler is used, at very specific frequency intervals, the transmission loss goes to 0 and the objectionable noises can be transferred to the interior compartment of the vehicle. In this type of situation, an engineer is forced to choose an air conditioning muffler of length and diameter that results in maxima/minima of muffler performance at non-critical frequency bands, a nondesirable characteristic. However, by using a muffler of the present invention, the resulting noise reduction plot is comparable as that shown as line C in FIG. 4. By using a multiplicity of varying chamber lengths (L) between the restrictions or expansions 24, there is no need to approximate or design for maxima and minima muffler performance at non-critical frequency bands since the cumulative effect of each of the chamber lengths is achieved in a single muffler device. Line C shows that cumulative effects of such a muffler device and at no location along line C does the noise reduction go to 0 as with expansion chambers of a single length. By choosing the chamber length (L) between each of the attenuating zones 24 of the muffler device of the present invention, the muffler device can be "tuned" to maximize a noise reduction of the wave pulse propagations of the compressor (or other fluid device in other hydraulic systems) to achieve maximum noise reduction.

The present invention contemplates a method for tuning an air conditioning system to reduce noise produced by fluid pressure pulsations resulting from the compressor in the system. The steps of the method include measuring the frequency of the fluid pressure pulsations emanating from the compressor at various operating speeds. Next, an optimized tube muffler configuration for each measured frequency is determined. A tube muffler is then formed having a plurality of attenuating zones therein, including spacing the attenuating zones at unequal lengths from one another in accordance with the optimized tube muffler configurations for each measured frequency. The muffler is then inserted into the suction/discharge fluid flow from the compressor to achieve the desired noise reduction.

Figures 5, 6, 7:
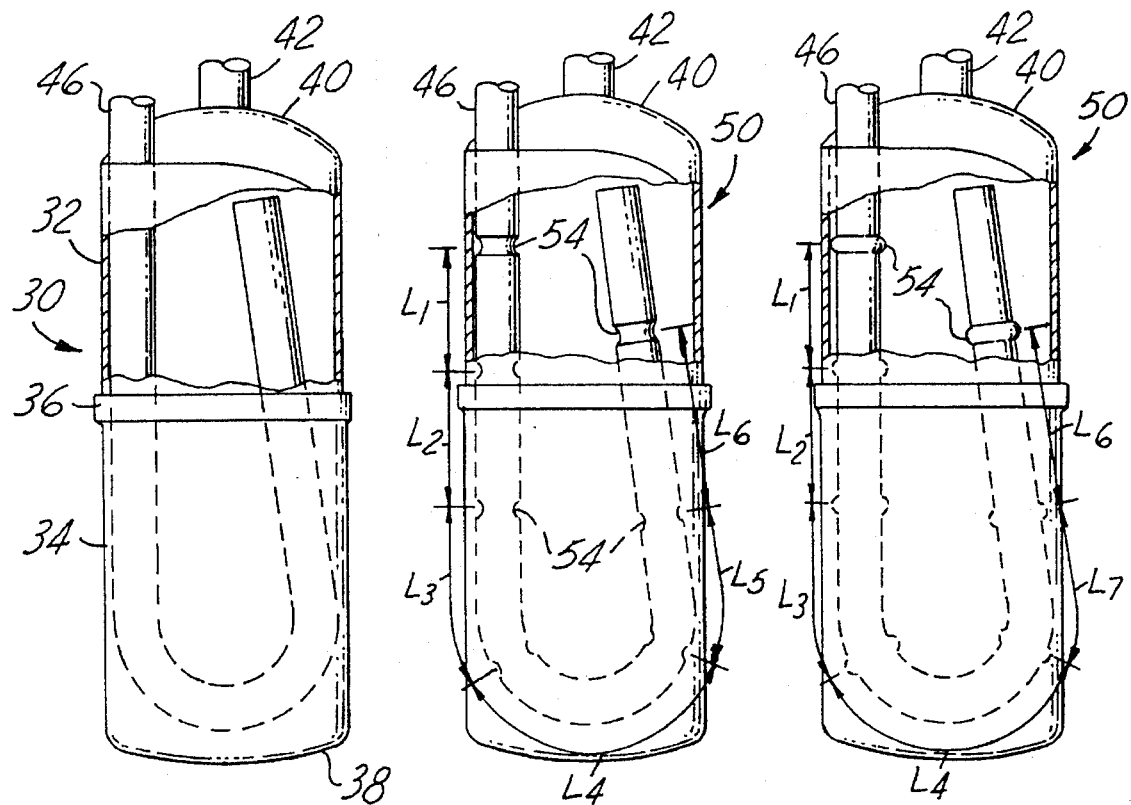
FIG. 5 is a schematic, partially cross-sectional view of a prior art automotive air conditioning accumulator.
FIG. 6 is a schematic, partially cross-sectional view of one embodiment of an automotive air conditioning accumulator structured in accord with the principles of the present invention.
FIG. 7 is a second embodiment of an automotive air conditioning accumulator structured in accord with the principles of the present invention.

FIGS. 5 and 6 show another application of the principles of the present invention in an accumulator used in an automotive air conditioning system. FIG. 4 shows a typical, prior art accumulator. As shown in FIG. 4, the accumulator includes a generally cylindrical housing 30 comprising an upper portion 32 and a lower portion 34. The portions 32 and 34 are generally joined together in abutting relationship at a predefined seam location 36 by means of an overlapping brazed or welded juncture. The lower end of the accumulator is closed by a lower wall 38, and the upper end of the accumulator is closed by a domed upper wall 40. An inlet tube 42 is received within an opening formed in the center of the domed wall 40 and is brazed thereat. An outlet tube 46 extends through another opening in the domed wall 40 adjacent to inlet tube 42, and it too is brazed to provide a partial seal on a permanent junction with the wall 40.

Outlet tube 46 extends vertically adjacent the inner wall of the accumulator and is curved at its lowermost portion, the curved portion being situated in the lowermost region in the accumulator adjacent to lower wall 38. The outlet tube has a generally constant cross-sectional area normal to the flow of fluid therethrough. The outlet tube 46 of the accumulator is fluidly connected to the compressor such that the wave pulse propagations from the compressor can be directly transmitted through the accumulator outlet tube 46 and the resultant noise can be transmitted to the interior of the vehicle through the accumulator and evaporator assembly.

FIGS. 5 and 6 show an accumulator 50 of the present invention which is generally similar to the accumulator shown in FIG. 4. Similarly, the accumulator 50 includes a generally cylindrical housing 30 defining a closed chambers the housing having an upper portion 32 and a lower portion 34. An inlet tube 42 extends into the chamber. The principal difference between the accumulators of FIGS. 5 and 6 and that of the prior art can easily be recognized as the outlet tube 52. The outlet tube 52 includes means for attenuating fluid pressure pulsations and resultant noise from the compressor. This means comprises a predetermined number of attenuating zones 54 formed in the outlet tube. Each zone 54 has a cross-sectional area of different size than the cross-sectional area of the outlet tube 52. As explained above with reference to FIGS. 2 and 3, the cross-sectional areas of the attenuating zone can either be smaller than a cross-sectional area of the outlet tube such as shown in FIG. 5 and thus form restrictions or can be expansions such as shown in FIG. 6 and have a cross-sectional area larger than a cross-sectional area of the outlet tube. The distances between each of the attenuating zones ($L_{1-6}$) are of unequal lengths for the same purposes as explained above. By providing the attenuating zones 54 spaced at unequal intervals along the outlet tube, the cumulative effect of a multiplicity of single expansion-type chamber muffler devices is achieved as shown in the noise reduction versus frequency plot of FIG. 4. Therefore, by providing attenuating zones, such as restrictions or expansions 54 in the outlet tube of the accumulator 50, the wave pulse propagations from the compressor can be attenuated prior to the air passage into the passenger compartment of the vehicle. Thus, the present invention reduces the objectionable noise produced by an automotive air conditioning component due to the refrigerant borne transmission path of wave pulse propagations.

Various other modifications and variations of the present invention will, no doubt, occur to those skilled in the art. It is the following claims, including all equivalents, which define the scope of the invention.

What is claimed is:

1. A muffler assembly for attenuating noise produced by fluid pressure pulsations in a hydraulic system of an automotive vehicle, the hydraulic system including a generally elongate fluid conduit member operative to receive the flow of fluid from the hydraulic system therethrough, the muffler assembly comprising:

a generally elongate tubular member connected to the fluid conduit member, the tubular member having a predetermined cross-sectional area normal to the fluid flow therethrough and defining a longitudinal axis generally parallel to the flow of fluid therethrough;

at least three attenuating zones formed integrally in the tubular member and being axially aligned and spaced apart along the longitudinal axis of the tubular member, each zone of the three zones having an equal cross-sectional area which is different than the cross-sectional area of said tubular member; and wherein the distances between adjacent attenuating zones are unequal.

2. An apparatus according to claim 1, wherein each attenuating zone has a cross-sectional area smaller than the cross-sectional area of said tubular conduit member.

3. An apparatus according to claim 1, wherein each attenuating zone has a cross-sectional area larger than the cross-sectional area of said fluid conduit member.

4. An apparatus according to claim 1, wherein the distances between attenuating zones are of predetermined lengths based upon the frequency of the pulsations to be attenuated.

5. A muffler assembly for attenuating noise produced by fluid pressure pulsations from a compressor of an automotive vehicle, comprising:

a generally elongate tubular member connected to the compressor for allowing fluid flow out of the compressor, the tubular member having a predetermined cross-sectional area normal to the fluid flow therethrough and defining a longitudinal axis generally parallel to the flow of fluid therethrough;

a predetermined number of spaced apart attenuating zones formed integrally in the tubular member and being axially aligned and spaced apart along the longitudinal axis of the tubular member, each one of the predetermined number of zones having the same cross-sectional area which is larger than the cross-sectional area of said tubular member; and wherein the predetermined number of zones and the distances between adjacent attenuating zones are based upon the frequency of the pulsations to be attenuated.

* * * * *